United States Patent
Tada et al.

(10) Patent No.: US 12,024,667 B2
(45) Date of Patent: Jul. 2, 2024

(54) COOLING LIQUID COMPOSITION

(71) Applicant: ENEOS CORPORATION, Tokyo (JP)

(72) Inventors: Akira Tada, Tokyo (JP); Yasushi Onumata, Tokyo (JP); Noriko Ayame, Tokyo (JP); Yohei Susukida, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 18/255,725

(22) PCT Filed: Aug. 31, 2021

(86) PCT No.: PCT/JP2021/031979
§ 371 (c)(1),
(2) Date: Jun. 2, 2023

(87) PCT Pub. No.: WO2022/123834
PCT Pub. Date: Jun. 16, 2022

(65) Prior Publication Data
US 2024/0002714 A1    Jan. 4, 2024

(30) Foreign Application Priority Data

Dec. 11, 2020   (JP) ................................. 2020-205746

(51) Int. Cl.
*C09K 5/10*   (2006.01)
(52) U.S. Cl.
CPC ...................... *C09K 5/10* (2013.01)

(58) Field of Classification Search
CPC ........................................................ C09K 5/10
See application file for complete search history.

(56) References Cited

U.S. PATENT DOCUMENTS

2012/0264661 A1    10/2012  Tsubouchi
2019/0264121 A1*    8/2019  China ................. H01M 10/625

FOREIGN PATENT DOCUMENTS

| JP | 2011-201953 A | 10/2011 |
| JP | 2013-043933 A | 3/2013 |
| JP | 2019-537647 A | 12/2019 |
| JP | 2020-511554 A | 4/2020 |
| WO | 2004/022982 A2 | 3/2004 |
| WO | 2011/077839 A1 | 6/2011 |

OTHER PUBLICATIONS

Nov. 16, 2021 International Search Report issued in International Patent Application No. PCT/JP2021/031979.
Jun. 13, 2023 International Preliminary Report on Patentability issued in International Patent Application No. PCT/JP2021/031979.

* cited by examiner

*Primary Examiner* — Vishal V Vasisth
(74) *Attorney, Agent, or Firm* — Oliff PLC

(57) ABSTRACT

A cooling liquid composition including: a hydrocarbon fluid having a mass-based average carbon number of 13 or more and 16 or less in which a total amount of a hydrocarbon having 13 or more and 15 or less carbon atoms is 50% by mass or more relative to an entire amount of the hydrocarbon fluid.

2 Claims, 1 Drawing Sheet

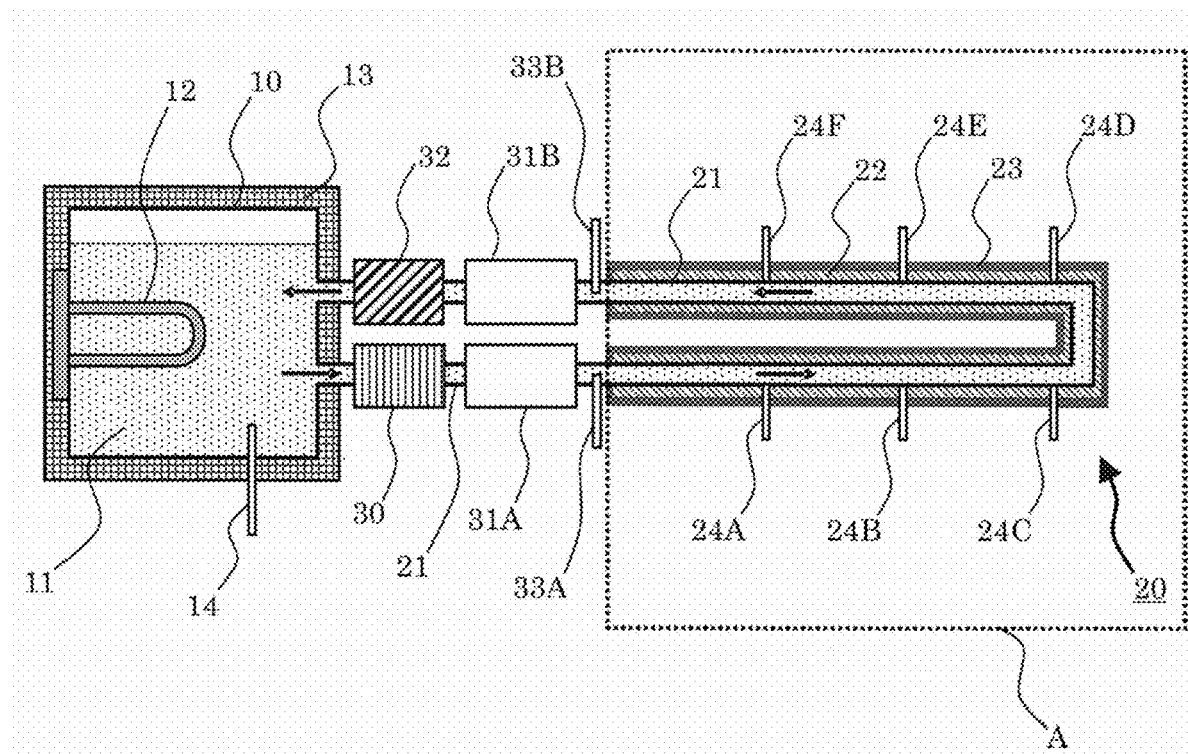

COOLING LIQUID COMPOSITION

This application is a 371 of PCT/JP2021/031979, filed Aug. 31, 2021.

TECHNICAL FIELD

The present invention relates to a cooling liquid composition.

BACKGROUND ART

Recently, electric vehicles which do not emit carbon dioxide, which is a greenhouse gas, have been attracting attention. In such electric vehicles, lithium-ion batteries are currently used as the batteries. Lithium-ion batteries generate heat when used or charged. If the temperature of a battery itself is increased by the heat generation, such temperature increase leads to deterioration or failure of the battery. For this reason, in the fields of electric vehicles and the like, methods for forcibly cooling a battery by using a cooling liquid have been proposed in order to maintain the battery at an appropriate temperature when the battery is used or charged. In this way, as the methods for cooling various devices (cooling targets) including batteries of electric vehicles and the like, methods using cooling liquids have been proposed, and various coolants and the like for use in such methods have conventionally been proposed.

For example, Japanese Unexamined Patent Application Publication No. 2013-043933 (PTL 1) discloses a coolant for charging and discharging devices which has a density of 0.84 g/cm$^3$ or less at 15° C., a kinematic viscosity of 20 mm$^2$/s or less at 40° C., a flash point of 190° C. or more, an amount of evaporation of 4.0 mg or less, and a conductivity of 10 pS/m or less. In addition, Japanese Unexamined Patent Application Publication No. 2011-201953 (PTL 2) discloses a coolant which has a density of 0.84 g/cm$^3$ or less at 15° C., a kinematic viscosity of 20 mm$^2$/s or less at 40° C., a flash point of 190° C. or more, and a conductivity of 10 pS/m or less. Moreover, International Publication No. WO2011/077839 (PTL 3) discloses a device-cooling oil obtained by blending a base oil for cooling a device, containing 30% by mass or more of a hydrocarbon compound and exhibiting a kinematic viscosity of 4 mm$^2$/s or more and 30 mm$^2$/s or less at 40° C., in which a total number of a terminal methyl group and a methylene group in a main chain of the hydrocarbon compound is 16 or more, and a total number of a methyl branch and an ethyl branch in a molecule of the hydrocarbon compound is one or less. However, the conventional coolants as described in PTLs 1 to 3 are not necessarily satisfactory in terms of exhibiting all of the cooling performance (having a high coefficient of heat transfer), the safety (having a high flash point), and the low-temperature performance (having a low pour point) at high levels in a well-balanced manner. Note that under such circumstances, particularly in the field of electric vehicles, the advent of a coolant having all of these properties at high levels in a well-balanced manner has been demanded in practice.

CITATION LIST

Patent Literature

[PTL 1] Japanese Unexamined Patent Application Publication No. 2013-043933
[PTL 2] Japanese Unexamined Patent Application Publication No. 2011-201953
[PTL 3] International Publication No. WO2011/077839

SUMMARY OF INVENTION

Technical Problem

The present invention has been made in view of the above-described problem of the conventional techniques, and an object thereof is to provide a cooling liquid composition having all of the cooling performance, the safety, and the low-temperature performance at high levels in a well-balanced manner.

Solution to Problem

As a result of conducting earnest studies in order to achieve the above-described object, the present inventors have found that by making a cooling liquid composition comprise a hydrocarbon fluid having a mass-based average carbon number of 13 or more and 16 or less in which a total amount of a hydrocarbon having 13 or more and 15 or less carbon atoms is 50% by mass or more relative to an entire amount of the hydrocarbon fluid, the cooling liquid composition thus obtained is enabled to have all the properties of the cooling performance, the safety, and the low-temperature performance at high levels in a well-balanced manner, and that, for example, in the case where this cooling liquid composition is used as a coolant for batteries of electric vehicles, it becomes possible to satisfy levels (demanded properties) demanded in the field of electric vehicles for all the properties of the cooling performance, the safety, and the low-temperature performance, and have thus completed the present invention.

Specifically, a cooling liquid composition of the present invention comprises: a hydrocarbon fluid having a mass-based average carbon number of 13 or more and 16 or less in which a total amount of a hydrocarbon having 13 or more and 15 or less carbon atoms is 50% by mass or more relative to an entire amount of the hydrocarbon fluid.

In addition, in the cooling liquid composition of the present invention, in the hydrocarbon fluid, the total amount of the hydrocarbon having 13 or more and 15 or less carbon atoms is preferably 60% by mass or more relative to the entire amount of the hydrocarbon fluid.

Moreover, in the cooling liquid composition of the present invention, the mass-based average carbon number of the hydrocarbon fluid is preferably 14 or more and 16 or less.

Advantageous Effects of Invention

The present invention makes it possible to provide a cooling liquid composition having all of the cooling performance, the safety, and the low-temperature performance at high levels in a well-balanced manner.

BRIEF DESCRIPTION OF DRAWINGS

FIG. 1 is a cross-sectional view schematically showing a device used for measuring a coefficient of heat transfer of each of cooling liquid compositions of Examples 1 to 5 and Comparative Examples 1 to 5.

DESCRIPTION OF EMBODIMENTS

Hereinafter, the present invention will be described in detail based on a preferred embodiment thereof. Note that in the Specification, regarding numerical values X and Y, the expression "X to Y" means "X or more and Y or less" unless otherwise noted. In such expression, in the case where unit is attached only to the numerical value Y, the unit also applies to the numerical value X as well.

A cooling liquid composition of the present invention comprises: a hydrocarbon fluid having a mass-based average carbon number of 13 or more and 16 or less in which a total amount of a hydrocarbon having 13 or more and 15 or less carbon atoms is 50% by mass or more relative to an entire amount of the hydrocarbon fluid.

Note that the "hydrocarbon fluid" in the Specification refers to a fluid composed of a mixture (composition) of hydrocarbons having different carbon numbers. In the Specification, as a mass-based ratio (% by mass) of a total amount of a hydrocarbon having a carbon number within a specific range (for example, 13 or more and 15 or less) to an entire amount of a hydrocarbon fluid, and a mass-based average carbon number of the hydrocarbon fluid, values obtained through gas chromatography are employed, and specifically, values obtained by employing a method described in "Method for Analyzing Hydrocarbon Fluid through Gas Chromatography" described below are employed.

(Method for Analyzing Hydrocarbon Fluid through Gas Chromatography)

First, gas chromatography is performed on a hydrocarbon fluid which is a measurement target under the conditions described below to obtain a gas chromatogram of the hydrocarbon fluid. Next, gas chromatography is performed under the same conditions to obtain a gas chromatogram of a mixture of linear saturated hydrocarbons (normal paraffins) as a reference material. Then, the gas chromatogram of the hydrocarbon fluid and the gas chromatogram of the mixture of linear saturated hydrocarbons as the reference material are compared to obtain a relation (hereinafter, sometimes referred to simply as a "carbon number distribution") between the carbon numbers of hydrocarbons contained in the hydrocarbon fluid, which is the measurement target, and the mass-based content (content ratio: % by area) for the hydrocarbon of each carbon number. Subsequently, based on the carbon number of each hydrocarbon contained in the hydrocarbon fluid and the mass-based content for the hydrocarbon having each carbon number obtained in this way, a ratio (mass-based ratio: % by mass) of the total amount of the hydrocarbon having a carbon number within a specific range (for example, 13 or more and 15 or less) to the entire amount of the hydrocarbon fluid can be obtained. In addition, from the carbon number distribution obtained as described above, a product of the carbon number and the value (% by area) of the mass-based content of the hydrocarbon having the carbon number, for each carbon number, is obtained for all the hydrocarbons in the hydrocarbon fluid. Thereafter, a mass-based average carbon number of the hydrocarbon fluid can be obtained by obtaining an average value from the total sum of the products (by dividing the total sum by 100). However, in the above-described analyzing method, regarding hydrocarbons having the same carbon number, the structures of the hydrocarbons, such as branched, cyclic, saturated (exclusive of linear ones), and unsaturated structures cannot be specified. For this reason, regarding the hydrocarbon fluid in the present invention, for example, the structures of hydrocarbons contained in the fluid may be recognized based on the type of the hydrocarbon fluid used. Specifically, for example, it may be recognized that the hydrocarbon fluid in the present invention does not contain aromatic hydrocarbons based on the type of the hydrocarbon fluid used. Moreover, for example, it may be recognized that the hydrocarbon fluid in the present invention is composed of branched saturated hydrocarbons and/or cyclic saturated hydrocarbons based on the type of the hydrocarbon fluid used (note that in a case where it can be determined that the hydrocarbon fluid contains linear saturated hydrocarbons from the peak of the reference material, the hydrocarbon fluid is composed of branched saturated hydrocarbons and/or cyclic saturated hydrocarbons as well as linear saturated hydrocarbons). On the other hand, in the above-described analyzing method, the content of linear saturated hydrocarbons in the hydrocarbon fluid can be measured based on the magnitude of the peak at a position which coincides with the peak of the reference material.

<Conditions for Gas Chromatography>

Measuring device GC-2010 (manufactured byShimadzu Corporation)

Column Ultra ALLOY-1HT (length: 30 mm, inner diameter: 0.25 mm: manufactured by Frontier Laboratories Ltd.)

Carrier gas: Helium (100 kPa)

Measurement sample: The hydrocarbon fluids were used as they are (used without dilution with a solvent)

Amount of sample injected: 0.2 μL

Detector: Flame ionization detector (FID)

Detector temperature: 300° C.

Oven temperature: After held at 40° C. for 5 minutes, the temperature is increased to 280° C. at a temperature increasing rate of 5° C./min.

The hydrocarbon fluid according to the present invention satisfies a condition (I) that a mass-based average carbon number is 13 or more and 16 or less. By setting the mass-based average carbon number to 13 or more, it is possible to further enhance the flash point of the cooling liquid composition as compared with the case where the mass-based average carbon number is less than this value. On the other hand, by setting the mass-based average carbon number to 16 or less, it is possible to further enhance the coefficient of heat transfer and further lower the pour point of the cooling liquid composition, making it possible to obtain a cooling liquid composition having higher cooling performance, as compared with the case where the mass-based average carbon number is more than this value. Note that since higher advantageous effects can be achieved from the same viewpoint, the mass-based average carbon number of the hydrocarbon fluid is more preferably 14 or more and 16 or less (further preferably 14.5 or more and 16 or less).

The hydrocarbon fluid according to the present invention satisfies a condition (II) that a total amount of a hydrocarbon having 13 or more and 15 or less carbon atoms is 50% by mass or more relative to an entire amount of the hydrocarbon fluid. By setting the total amount of the hydrocarbon having 13 or more and 15 or less carbon atoms to 50% by mass or more relative to the entire amount of the hydrocarbon fluid, it is possible to improve the coefficient of heat transfer, the flash point, and the pour point of the cooling liquid composition in a well-balanced manner as compared with the case where the total amount is less than this value. Note that since higher advantageous effects can be achieved from the same viewpoints, the ratio of the total amount of the hydrocarbon having 13 or more and 15 or less carbon atoms to the entire amount of the hydrocarbon fluid is more preferably 60% by mass or more (further preferably 75% by mass or more).

The hydrocarbon fluid is preferably such that a total amount of a hydrocarbon having 14 or more and 15 or less carbon atoms is 50% by mass or more (more preferably 60% by mass or more, and further preferably 75% by mass or more) relative to the entire amount of the hydrocarbon fluid. By setting the total amount of the hydrocarbon having 14 or more and 15 or less carbon atoms to the lower limit value or more, it is possible to improve the coefficient of heat transfer, the flash point, and the pour point in a more balanced manner.

The hydrocarbon fluid is preferably such that a total amount of a hydrocarbon having 12 or less carbon atoms is 10% by mass or less (more preferably 2% by mass or less) relative to the entire amount of the hydrocarbon fluid. By setting the total amount of the hydrocarbon having 12 or less carbon atoms to the upper limit value or less, it is possible to further improve the flash point.

The hydrocarbon fluid is preferably such that a total amount of a hydrocarbon having 16 or more carbon atoms is 44% by mass or less (more preferably 40% by mass or less) relative to the entire amount of the hydrocarbon fluid. By setting the total amount of the hydrocarbon having 16 or more carbon atoms to the upper limit value or less, it is possible to further lower the pour point while further improving the coefficient of heat transfer.

Moreover, it is preferable that the hydrocarbon fluid according to the present invention substantially do not contain aromatic hydrocarbons (more preferably, the content of aromatic hydrocarbons is 1% by mass or less relative to the entire amount of the hydrocarbon fluid). In the case where the hydrocarbon fluid contains substantially no aromatic hydrocarbons, since this hydrocarbon fluid is a fluid composed of a mixture (composition) of hydrocarbons having different carbon numbers in the first place, the hydrocarbon fluid is basically composed of linear hydrocarbons and/or branched hydrocarbons and/or cyclic hydrocarbons. This makes it possible to further improve the coefficient of heat transfer.

In addition, it is preferable that the hydrocarbon fluid according to the present invention be substantially composed of branched saturated hydrocarbons and/or cyclic saturated hydrocarbons (the content (total amount) of branched saturated hydrocarbons and cyclic saturated hydrocarbons is more preferably 90% by mass or more (further preferably 94% by mass or more) relative to the entire amount of the hydrocarbon fluid). By setting the content (total amount) of branched saturated hydrocarbons and cyclic saturated hydrocarbons to the lower limit value or more, it is possible to further lower the pour point.

The hydrocarbon fluid is more preferably such that the content (total amount) of linear saturated hydrocarbons is 10% by mass or less (further preferably 6% by mass or less) relative to the entire amount of the hydrocarbon fluid. When the content of the linear saturated hydrocarbons is equal to or less than the upper limit, it is possible to further lower the pour point. In addition, it is preferable that the hydrocarbon fluid be composed of branched saturated hydrocarbons and/or cyclic saturated hydrocarbons, and 10% by mass or less (further preferably 6% by mass or less) of linear saturated hydrocarbons relative to the entire amount of hydrocarbon fluid. Note that in the Specification, as the content (total amount) of linear saturated hydrocarbons, a value obtained by the aforementioned method for analyzing a hydrocarbon fluid through gas chromatography is employed.

The hydrocarbon fluid is preferably such that the density at 15° C. is 0.77 to 0.86 g/cm$^3$ (more preferably 0.79 to 0.84 g/cm$^3$). In the case where the density at 15° C. is equal to or less than the upper limit, it is possible to further improve the heat·oxidative stability as compared with the case where the density at 15° C. is more than the upper limit. On the other hand, in the case where the density at 15° C. is equal to or more than the lower limit value, it is possible to further enhance the coefficient of heat transfer as compared with the case where the density at 15° C. is less than the lower limit value. Note that in the Specification, the "density at 15° C." means a density at 15° C. measured in compliance with JIS K 2249-1-1995.

The hydrocarbon fluid is preferably such that the flash point is 90° C. or more (more preferably 100° C. or more, and further preferably 110° C. or more). By setting the flash point to the lower limit value or more, the safety when the hydrocarbon fluid is used as a coolant is further enhanced as compared with the case where the flash point is less than this value. Note that in the Specification, the "flash point" means a flash point measured in compliance with JIS K 2265-3: 2007 (Pensky-Martens closed cup method (PM method)).

The hydrocarbon fluid is preferably such that the pour point is −25° C. or less (more preferably −30° C., and further preferably −40° C. or less). In the case where the pour point is equal to or less than the upper limit value, it is possible to further expand the usable temperature range at low temperatures when the hydrocarbon fluid is used as a coolant as compared with the case where the pour point is more than this value. Note that in the Specification, the "pour point" means a pour point measured in compliance with JIS K 2269-1987.

The hydrocarbon fluid according to the present invention only has to be composed of a mixture (composition) of hydrocarbons that satisfies the above-mentioned conditions (I) and (II), and the method for producing the hydrocarbon fluid is not particularly limited.

The cooling liquid composition of the present invention only has to contain the hydrocarbon fluid, and may contain a publicly-known additive used in the field of coolants as appropriate depending on the usage or the like in addition to the hydrocarbon fluid as long as the object of the present invention is not impaired. The additive is not particularly limited, but includes, for example, an antioxidant, a metal deactivator, a surfactant, a corrosion inhibitor, an antifoam, and the like in the case where the cooling liquid composition is used as a coolant for batteries of electric vehicles.

In the cooling liquid composition of the present invention, the content of the hydrocarbon fluid is not particularly limited, but is preferably 95% by mass or more (more preferably 98% by mass to 100% by mass) relative to the total amount of the cooling liquid composition. By setting the content of the hydrocarbon fluid to the lower limit value or more, it is possible to further reflect the properties possessed by the hydrocarbon fluid such as the flash point and the pour point in the cooling liquid composition as compared with the case the content of the hydrocarbon fluid is less than this value. Note that the cooling liquid composition of the present invention is preferably such that the flash point is 90° C. or more (more preferably 100° C. or more, and further preferably 110° C. or more) and the pour point is −25° C. or less (more preferably −30° C., and further preferably −40° C. or less). In addition, the cooling liquid composition of the present invention may be composed of only the hydrocarbon fluid (composition of hydrocarbons).

Since the cooling liquid composition of the present invention has all of the cooling performance, the safety, and the low-temperature performance at high levels in a well-balanced manner, the cooling liquid composition of the present invention can be used, for example, as a coolant for cooling batteries, power control units, motors, oil coolers, transmissions, and the like of electric vehicles, and the like. Note that since the levels of the coefficient of heat transfer, the flash point, and the pour point possessed by the cooling liquid composition of the present invention satisfy the levels required for coolants for batteries of electric vehicles (satisfy properties required for coolants for batteries of electric vehicles), the cooling liquid composition of the present invention can be particularly favorably used as a coolant for batteries of electric vehicles.

EXAMPLES

Hereinafter, the present invention will be described in further detail based on Examples and Comparative Examples, the present invention is not limited to the following Examples.

Examples 1 to 5 and Comparative Examples 1 to 5

Compositions having compositions described in Table 1 were used as cooling liquid compositions (in Example 1, Examples 3 to 5, and Comparative Examples 1 to 5, hydrocarbon fluids themselves were used as cooling liquid compositions, and in Example 2, a mixture of the hydrocarbon fluid and additives was used as a cooling liquid composition). Note that regarding the compositions of the cooling liquid compositions described in Table 1, the blank space indicates that the composition did not contain the corresponding component. Moreover, regarding the hydrocarbon fluid, "inmass %", which is the unit of the content of the hydrocarbon having each carbon number, represents the content (% by mass) of the hydrocarbon having each carbon number relative to the entire amount of the hydrocarbon fluid, and "mass %", which is the unit of the content of the additive, represents the content (% by mass) of the additive relative to the entire amount of the cooling liquid composition (the total amount of the hydrocarbon fluid and the additive). Note that the carbon number of each hydrocarbon in each hydrocarbon fluid, the content (inmass %:mass %) of the hydrocarbon of each carbon number, the mass-based average carbon number of each hydrocarbon fluid, as well as the ratio (inmass %:mass %) of the total amount of the hydrocarbons having 13 or more and 15 or less carbon atoms relative to the total amount of each hydrocarbon fluid described in Table 1 are values obtained by employing the above-mentioned "Method for Analyzing Hydrocarbon Fluid through Gas Chromatography". In addition, it is recognized that the hydrocarbon fluids used in the respective Examples and Comparative Examples did not contain aromatic hydrocarbons from the types of the hydrocarbon fluids used. Moreover, it is recognized that the hydrocarbon fluids used in the respective Examples and Comparative Examples were composed mainly of branched saturated hydrocarbons and/or cyclic saturated hydrocarbons from the types of the hydrocarbon fluids used, the results of analysis by the above-described analyzing method, the fact that in the above-described analyzing method, regarding hydrocarbons having the same carbon number, the structures of the hydrocarbons, such as branched, cyclic, saturated (exclusive of linear ones), and unsaturated structures cannot be specified, and the like (Note that all the hydrocarbon fluids used in Examples 1 to 5 were such that the contents of linear saturated hydrocarbons were 6% by mass or less relative to the total amounts of the hydrocarbon fluid as a result of the analysis by the above-described analyzing method).

[Regarding Method for Evaluating Properties of Cooling Liquid Composition Obtained in Each Example or the Like]

<Measurement of Flash Point>

The flash point of each cooling liquid composition was measured in compliance with JIS K 2265-3:2007 (Pensky-Martens closed cup method (PM method)). Results thus obtained are shown in Table 1. Note that in the case where the flash point is 90° C. or more, it is determined that the flash point is at a high level.

<Measurement of Pour Point>

The pour point of each cooling liquid composition was measured in compliance with JIS K 2269-1987. Results thus obtained are shown in Table 1. Note that in the case where the pour point is −25° C. or less, it is determined that the pour point is at a high level.

<Measurement of Coefficient of Heat Transfer>

The coefficient of heat transfer of each cooling liquid composition was measured by using a device shown in FIG. 1 in the following manner. Note that FIG. 1 is a cross-sectional view schematically showing the device used for measuring a coefficient of heat transfer of each of the cooling liquid compositions. In addition, the device shown in FIG. 1 basically includes: a container 10 made of stainless steel and having a capacity of 40 L; a sample 11 composed of a cooling liquid composition introduced into the container 10; a sample temperature adjusting heater 12 provided for adjusting the temperature of the sample 11 introduced into the container 10; a heat insulating material 13 covering the periphery of the container 10 and the heater 12; a temperature sensor 14 for checking the temperature of the sample in the container 10; a U-shaped aluminum tube 21 connected to the container 10: and a heat exchange unit 20 formed by using the aluminum tube 21 (a portion made up of a plurality of constituents in a region A surrounded by a dotted line: Each constituent will be described later); a vortex pump 30 provided on the aluminum tube 21 for allowing the sample 11 to flow into the heat exchange unit 20; a bourdon tube pressure gauge 31A for measuring the pressure of the sample 11 discharged from the vortex pump 30 (the sample 11 before flowing into the heat exchange unit 20); a bourdon tube pressure gauge 31B for measuring the pressure of the sample after passing through the heat exchange unit 20; a volumetric flow meter 32 for measuring the flow rate of the sample 11 after passing through the heat exchange unit 20; a thermocouple 33A for measuring the temperature of the sample 11 at the position of the inlet of the heat exchange unit 20; and a thermocouple 33B for measuring the temperature of the sample 11 at the position of the outlet of the heat exchange unit 20. Note that in the device shown in FIG. 1, the heat exchange unit 20 present in the region A surrounded by the dotted line includes: the aluminum tube 21; six heat-exchanging heaters 22 provided to cover the aluminum tube 21 in the heat exchange unit 20; a heat insulating material 23 covering the aluminum tube 21 and the heat-exchanging heaters 22 in the heat exchange unit 20; and six thermocouples 24A to 24F for measuring the temperature of the tube wall of the aluminum tube 21. Note that in FIG. 1, arrows in the aluminum tube 21 schematically indicate the direction of flow of the sample 11 in the aluminum tube.

Here, as the sample temperature adjusting heater 12, a heater having a heating capacity of 1000 W was used, and as the heat-exchanging heaters 22, six mantle heaters for tubes each having a heating capacity of 1180 W (the thickness of each heater: 1 mm) were used and arranged to cover the entire outer wall of the aluminum tube 21 in the heat exchange unit 20 so as to uniformly heat the aluminum tube 21 in the heat exchange unit 20. In addition, as the U-shaped aluminum tube 21, an aluminum tube having an inner diameter of 10 mm and a tube wall thickness of 1 mm was used such that the full length of the aluminum tube 21 in the heat exchange unit 20 (the length from the inlet to the outlet of the heat exchange unit 20) was 4.86 m. In addition, in the heat exchange unit 20, the six thermocouples 24A to 24F for measuring the temperature of the tube wall of the aluminum tube 21 were provided at uniform intervals of 0.78 m from the point 0.48 m from the inlet and were in contact with the tube wall of the aluminum tube 21. In addition, as the vortex pump 30, a vortex pump that was capable of introducing the sample 11 into the aluminum tube 21 in the heat exchange unit 20 under a condition of flow rate: 0.02 m³/min was used. In addition, the bourdon tube pressure gauge 31A was arranged near the inlet of the heat exchange unit 20 and used for measuring the pressure of the sample 11 flowing into the heat exchange unit 20. On the other hand, the bourdon tube pressure gauge 31B was arranged near the outlet of the heat exchange unit 20 and used for measuring the pressure of the sample 11 discharged from the heat exchange unit 20. In addition, the volumetric flow meter 32 was used for checking the flow rate of the sample 11 flowing into the container after passing through the heat exchange unit 20.

In addition, in the measurement, the device shown in FIG. 1 was used, and after 36 L of each cooling liquid composition was thrown in the container 10 as the sample 11, the sample temperature adjusting heater 12 was operated while the temperature was checked with the temperature sensor 14 such that the temperature of the sample 11 in the container 10 became 40° C. (constant), and further the vortex pump 30 was operated such that the sample 11 flowed into the heat exchange unit 20 under a condition of flow rate: 0.01 m³/min. In addition, in the heat exchange unit 20, the six heat-exchanging heaters 22 (heating capacity: 1180 W) were operated periodically such that the duty ratio became 0.2 to heat the tube wall of the aluminum tube 21. Such operations of the heater 12, the heater 22, and the vortex pump 30 were continuously performed such that the device entered the steady state, then the temperatures of the tube wall of the aluminum tube 21 were measured at six portions by using the six thermocouples 24A to 24F in the heat exchange unit 20, and an average value of the temperatures thus measured was obtained as the temperature of the tube wall of the aluminum tube 21 ($T_h$: the average value of 6 portions). In addition, after the device entered the steady state, the temperature [sample inlet temperature ($T_{in}$)] of the sample 11 at the position of the inlet of the heat exchange unit 20 (the sample 11 flowing into the heat exchange unit 20) and the temperature [sample outlet temperature ($T_{out}$)] of the sample 11 at the position of the outlet of the heat exchange unit 20 (the sample 11 discharged from the heat exchange unit 20) were measured by using the thermocouple 33A and the thermocouple 33B, and the sample temperature ($T_c$) in the heat exchange unit 20 was obtained by obtaining an average value of these temperatures. Note that the calculation formula for obtaining the sample temperature ($T_c$) is the following formula:

$$T_c = (T_{out} + T_{in})/2.$$

Note that in the device shown in FIG. 1, since the full length of the aluminum tube in the heat exchange unit 20 is 4.86 m and the inner diameter of the aluminum tube is 0.01 m (10 mm), it is understood that the area (heat exchange area (A)) of the surface of the tube wall of the aluminum tube coming into contact with the sample 11 in the heat exchange unit 20 is 0.153 m². The calculation formula for obtaining the heat exchange area(A) is the following formula:

$$A = 4.86 \text{ m(full length)} \times 0.01 \text{ m(inner diameter)} \times 3.14$$

(pi)=0.153 m². Moreover, since the six heaters 22 each having a heating capacity of 1180 W are used such that the duty ratio becomes 0.2, it is understood that the heat exchange amount (Q) in the heat exchange unit 20 is 1416 W. The calculation formula for obtaining the heat exchange amount (Q) is the following formula:

$$Q = 1180 \text{ W(heat amount)} \times 6 \text{(the number of heaters)} \times 0.2 \text{(duty ratio)} = 1416 \text{ W}.$$

In this way, for each sample (cooling liquid composition), the values of the sample temperature ($T_c$) of the heat exchange unit 20 and the tube wall temperature ($T_h$) of the aluminum tube of the heat exchange unit 20 were measured, and then the coefficient of heat transfer (unit: W/m²·K) of each cooling liquid composition was obtained by using the calculated value of the heat exchange amount (Q) in the heat exchange unit 20 and the calculated value of the heat exchange area (A) of the heat exchange unit 20. Note that for calculating the coefficient of heat transfer (unit: W/m²·K) of each cooling liquid composition, the following formula (I):

$$h = Q/\{A(T_h - T_c)\} \tag{I}$$

[in the formula (I), h represents the coefficient of heat transfer of the cooling liquid composition, $T_c$ represents the sample temperature (the measured value in the heat exchange unit 20), $T_h$ represents the tube wall temperature (the measured value in the heat exchange unit 20), Q represent the heat exchange amount (calculated value: 1416 w), and A represents the heat exchange area (calculated value: 0.153 m²)] was used. Results thus obtained are shown in Table 1. Note that it can be said that the larger the value of the coefficient of heat transfer, the higher the cooling property of the cooling liquid composition. From such viewpoint, in the case where the value of the coefficient of heat transfer is 1100 W/m²·K or more, it is determined that the coefficient of heat transfer is at a high level.

TABLE 1

|  |  |  | Example 1 | Example 2 | Example 3 | Example 4 | Example 5 |
|---|---|---|---|---|---|---|---|
| Composition of cooling liquid composition | hydrocarbon fluid | Hydrocarbon having 11 carbon atoms (in mass %) |  |  |  |  |  |
|  |  | Hydrocarbon having 12 carbon atoms (in mass %) |  |  |  |  | 1.5 |
|  |  | Hydrocarbon having 13 carbon atoms (in mass %) | 2.0 | 2.0 | 3.0 | 4.0 | 72.0 |
|  |  | Hydrocarbon having 14 carbon atoms (in mass %) | 33.0 | 33.0 | 43.5 | 54.0 | 26.5 |
|  |  | Hydrocarbon having 15 carbon atoms (in mass %) | 26.5 | 26.5 | 34.0 | 42.0 |  |
|  |  | Hydrocarbon having 16 carbon atoms (in mass %) | 6.0 | 6.0 | 3.5 |  |  |
|  |  | Hydrocarbon having 17 carbon atoms (in mass %) | 22.5 | 22.5 | 11.0 |  |  |
|  |  | Hydrocarbon having 18 carbon atoms (in mass %) | 10.0 | 10.0 | 5.0 |  |  |
|  |  | Hydrocarbon having 19 carbon atoms (in mass %) |  |  |  |  |  |
|  |  | Total amount of hydrocarbons (in mass %) | 100.0 | 100.0 | 100.0 | 100.0 | 100.0 |
|  | Additive[*1] (mass %) |  |  | 0.16 |  |  |  |

TABLE 1-continued

| Properties of hydrocarbon fluid | Mass-based average carbon number | 15.4 | 15.4 | 14.8 | 14.4 | 13.3 |
|---|---|---|---|---|---|---|
| | Ratio of total amount of hydrocarbons having 13 or more and 15 or less carbon atoms to entire amount of hydrocarbon fluid (in mass %) | 61.5 | 61.5 | 80.5 | 100.0 | 98.5 |
| Properties of cooling liquid composition | Coefficient of thermal transfer [unit: W/m² · K] | 1290 | 1290 | 1400 | 1500 | 1530 |
| | Flash point (PM method) [unit: °C.] | 117 | 116 | 110 | 106 | 93 |
| | Pour point [unit: °C.] | −30 | −30 | −45 | <−45 | <−45 |

| | | Comparative Example 1 | Comparative Example 2 | Comparative Example 3 | Comparative Example 4 | Comparative Example 5 |
|---|---|---|---|---|---|---|
| Composition of cooling liquid composition | hydrocarbon fluid | | | | | |
| | Hydrocarbon having 11 carbon atoms (in mass %) | | 6.5 | 7.5 | 8.5 | |
| | Hydrocarbon having 12 carbon atoms (in mass %) | | 38.5 | 40.5 | 47.0 | |
| | Hydrocarbon having 13 carbon atoms (in mass %) | | 35.0 | 20.0 | 14.5 | 2.0 |
| | Hydrocarbon having 14 carbon atoms (in mass %) | 1.0 | 17.5 | 14.0 | 0.5 | 30.0 |
| | Hydrocarbon having 15 carbon atoms (in mass %) | 4.0 | 2.5 | 10.5 | 1.0 | 23.0 |
| | Hydrocarbon having 16 carbon atoms (in mass %) | 14.0 | | 3.0 | 4.0 | 0.5 |
| | Hydrocarbon having 17 carbon atoms (in mass %) | 55.5 | | 3.0 | 17.0 | 3.5 |
| | Hydrocarbon having 18 carbon atoms (in mass %) | 25.5 | | 1.5 | 7.5 | 24.5 |
| | Hydrocarbon having 19 carbon atoms (in mass %) | | | | | 16.5 |
| | Total amount of hydrocarbons (in mass %) | 100.0 | 100.0 | 100.0 | 100.0 | 100.0 |
| | Additive(*1) (mass %) | | | | | |
| Properties of hydrocarbon fluid | Mass-based average carbon number | 17.0 | 12.7 | 13.1 | 13.6 | 16.1 |
| | Ratio of total amount of hydrocarbons having 13 or more and 15 or less carbon atoms to entire amount of hydrocarbon fluid (in mass %) | 5.0 | 55.0 | 44.5 | 16.0 | 55.0 |
| Properties of cooling liquid composition | Coefficient of thermal transfer [unit: W/m² · K] | 1020 | 1700 | 1670 | 1640 | 920 |
| | Flash point (PM method) [unit: °C.] | 138 | 84 | 85 | 57 | 126 |
| | Pour point [unit: °C.] | −17.5 | <−45 | <−45 | −40 | −22.5 |

(*1)The content (0.16% by mass) of the additives is a ratio of the total amount of the following components (A) to (C) to the entire amount of the cooling liquid composition.
(A) a phenolic antioxidant . . . 0.1% by mass
(B) an amine-based antioxidant . . . 0.05% by mass
(C) a triazole-based metal deactivator . . . 0.01% by mass As is clear from the results shown in Table 1, it was found that in the case where a hydrocarbon fluid having a mass-based average carbon number of 13 or more and 16 or less in which a total amount of hydrocarbons having 13 or more and 15 or less carbon atoms was 50% by mass or more relative to an entire amount of the hydrocarbon fluid was used in a cooling liquid composition (Examples 1 to 5), all of the coefficient of heat transfer, the flash point, and the pour point possessed by the cooling liquid composition were made at high levels, and the cooling liquid composition had these properties at high levels in a well-balanced manner.

In contrast, in the case where a hydrocarbon fluid having a mass-based average carbon number of more than 16 in which a total amount of hydrocarbons having 13 or more and 15 or less carbon atoms was less than 50% by mass relative to an entire amount of the hydrocarbon fluid was used in a cooling liquid composition (Comparative Example 1), it was unsuccessful to make either the coefficient of heat transfer or the pour point at a satisfactory level (which can be determined to be a high level based on the aforementioned determination standards). In addition, in the case where a hydrocarbon fluid in which a total amount of hydrocarbons having 13 or more and 15 or less carbon atoms was 50% by mass or more relative to an entire amount of the hydrocarbon fluid, but the mass-based average carbon number was less than 13 was used in a cooling liquid composition (Comparative Example 2), it was unsuccessful to make the flash point at a satisfactory level. In addition, in the case where a hydrocarbon fluid in which a total amount of hydrocarbons having 13 or more and 15 or less carbon atoms was 50% by mass or more relative to an entire amount of the hydrocarbon fluid, but the mass-based average carbon number was more than 16 was used in a cooling liquid composition (Comparative Example 5), it was unsuccessful to make either the coefficient of heat transfer or the pour point at a satisfactory level. Moreover, in the case where a hydrocarbon fluid having a mass-based average carbon number of 13 or more and 16 or less in which however a total amount of hydrocarbons having 13 or more and 15 or less carbon atoms was less than 50% by mass relative to an entire amount of the hydrocarbon fluid was used in a cooling liquid composition (Comparative Examples 3 and 4), it was unsuccessful to make the flash point at a satisfactory level.

From such results, it was confirmed that the cooling liquid composition of the present invention comprising: a hydrocarbon fluid having a mass-based average carbon number of 13 or more and 16 or less in which a total amount of a hydrocarbon having 13 or more and 15 or less carbon atoms was 50% by mass or more relative to an entire amount of the hydrocarbon fluid was capable of making all of the properties of the coefficient of heat transfer, the flash point, and the pour point at satisfactorily high levels, and had these properties in a well-balanced manner.

In the case where the flash point is 90° C. or more, the pour point is −25° C. or less, and the coefficient of heat transfer is 1100 W/m²·K or more, it is considered that the cooling liquid composition satisfies the properties (cooling performance, safety, and the like) required as a cooling liquid for batteries of electric vehicles. In addition, in the case where the hydrocarbon fluid is used in a cooling liquid composition without water added, there is no special need to deal with insulation or corrosion inhibition, and further in the case where the battery is a lithium-ion battery, even when the battery is broken, there is no concern that the cooling liquid composition reacts with lithium. Therefore, in the case of using the hydrocarbon fluid, it also becomes possible to use the cooling liquid composition by directly immersing and cooling the battery in the cooling liquid composition. From such viewpoints, it is understood that the above-described cooling liquid composition of the present invention can be particularly favorably used as a coolant for batteries of electric vehicles.

INDUSTRIAL APPLICABILITY

As described above, the present invention makes it possible to provide a cooling liquid composition having all of the cooling performance (having a high coefficient of heat transfer), the safety (having a high flash point), and the low-temperature performance (having a low pour point) at high levels in a well-balanced manner. Therefore, the cooling liquid composition of the present invention is particularly useful as a coolant and the like for use in various devices (for example, motors of hybrid vehicles, batteries of electric vehicles, and/or the like) in which cooling methods using cooling liquids are employed.

REFERENCE SIGNS LIST

10: container
11: sample
12: sample temperature adjusting heater
13: heat insulating material
14: temperature sensor
20: heat exchange unit
21: aluminum tube
22: heat-exchanging heater
23: heat insulating material
24A to 24F: thermocouple
30: vortex pump
31A and 31B: bourdon tube pressure gauge
32: volumetric flow meter
33A and 33B: thermocouple

The invention claimed is:

1. A cooling liquid composition comprising:
a hydrocarbon fluid having a mass-based average carbon number of 13 or more and 16 or less, a flash point of 100° C. or more, and a pour point of −40° C. or less, in which
a total amount of a hydrocarbon having 13 or more and 15 or less carbon atoms is 75% by mass or more relative to an entire amount of the hydrocarbon fluid, and
a total amount of a hydrocarbon having 14 or more and 15 or less carbon atoms is 75% by mass or more relative to an entire amount of the hydrocarbon fluid.

2. The cooling liquid composition according to claim 1, wherein
the mass-based average carbon number of the hydrocarbon fluid is 14 or more and 16 or less.

* * * * *